United States Patent
Drennan et al.

(10) Patent No.: US 8,345,023 B1
(45) Date of Patent: Jan. 1, 2013

(54) WIRELESS AND CONTACTLESS ELECTRONIC INPUT STYLUS HAVING AT LEAST ONE BUTTON WITH OPTICAL SCAN AND PROGRAMMABLE POINTER FUNCTIONALITY

(75) Inventors: Offie Lee Drennan, Austin, TX (US); Tram Q. Le, Round Rock, TX (US); Grace Lanni, Cedar Park, TX (US)

(73) Assignee: Motion Computing, Inc., Austin, TX (US)

( * ) Notice: Subject to any disclaimer, the term of this patent is extended or adjusted under 35 U.S.C. 154(b) by 534 days.

(21) Appl. No.: 12/642,999

(22) Filed: Dec. 21, 2009

Related U.S. Application Data (62) Division of application No. 11/032,369, filed on Jan. 10, 2005.

(51) Int. Cl.
  G06F 3/041    (2006.01)
  G06F 3/033    (2006.01)

(52) U.S. Cl. .............. 345/179; 345/173; 178/18.01; 178/18.03; 178/19.01

(58) Field of Classification Search .......... 345/173, 345/179; 178/18.01, 18.03, 19.01
See application file for complete search history.

(56) References Cited

U.S. PATENT DOCUMENTS

| | | | |
|---|---|---|---|
| 4,786,765 A | 11/1988 | Yamanami et al. | |
| 4,814,552 A | 3/1989 | Stefik et al. | |
| 5,004,871 A | 4/1991 | Purcell | |
| 5,109,141 A | 4/1992 | Purcell | |
| 5,138,304 A | 8/1992 | Bronson | |
| 5,227,622 A | 7/1993 | Suzuki | |
| 5,565,632 A | 10/1996 | Ogawa | |
| 5,576,502 A | 11/1996 | Fukushima et al. | |
| 5,717,435 A | 2/1998 | Fukushima et al. | |
| 5,729,251 A | 3/1998 | Nakashima | |
| 5,914,783 A | 6/1999 | Barrus | |
| 6,111,565 A | 8/2000 | Chery et al. | |
| 6,195,446 B1 | 2/2001 | Skoog | |
| 6,335,727 B1 | 1/2002 | Morishita et al. | |
| 6,577,299 B1 | 6/2003 | Schiller et al. | |
| 6,714,310 B1 | 3/2004 | Tanaka et al. | |
| 7,646,379 B1 * | 1/2010 | Drennan et al. | 345/177 |
| 2002/0190963 A1 | 12/2002 | Van Dam et al. | |
| 2006/0022942 A1 | 2/2006 | Lin | |

OTHER PUBLICATIONS

"Programming," Merriam-Webster Online Dictionary, www.merriam-webster.com/dictionary/programming, retrieved Apr. 14, 2009.

* cited by examiner

*Primary Examiner* — My-Chau T Tran (74) *Attorney, Agent, or Firm* — Kevin L. Daffer; Daffer McDaniel, LLP (57) ABSTRACT

A stylus input device, a stylus input device with display, and a method for entering input into a computer system are provided. The stylus is preferably used as a pointer that points to a particular region on an electronic display, and one or more buttons on the stylus can be used to scroll, modify or select that region. The buttons can be programmed in various ways to perform different functions, or one button can be programmed to perform a sequence of functions. The tip of the stylus need not contact the display surface to either render the stylus position or to select the region of the display shown by the stylus curser. The input device and system thereby operates in a contactless and wireless environment to leave the display area unencumbered to viewers of the display screen, and to allow more than one stylus to concurrently operate upon the display. The tip of the stylus can also be configured to scan an image of optically contrasting information, such as a barcode, in a contactless and wireless environment.

11 Claims, 6 Drawing Sheets

WIRELESS AND CONTACTLESS ELECTRONIC INPUT STYLUS HAVING AT LEAST ONE BUTTON WITH OPTICAL SCAN AND PROGRAMMABLE POINTER FUNCTIONALITY

PRIORITY CLAIM

The present application is a divisional from prior U.S. patent application Ser. No. 11/032,369 filed Jan. 10, 2005 now U.S. Pat. No. 7,646,379.

BACKGROUND OF THE INVENTION

1. Field of the Invention

The present invention relates in general to the field of electronic input devices and, more particularly, to a stylus that operates as a pointer to interact with information presented on an electronic display, and/or to read an image, absent contact with the display or label and having one or more buttons that can be programmed to perform differing input functions.

2. Description of the Related Art

The following descriptions and examples are not admitted to be prior art by virtue of their inclusion within this section.

Personal computers utilize various mechanisms in which to input information. For example, most personal computers have a port onto which a mouse can be connected. A typical mouse has one or more buttons and a scroll wheel. By moving the mouse, a cursor can be moved across an electronic display using various graphics driver software. Once the cursor is placed at the appropriate position, a button can be clicked to select a portion of the displayed subject matter, such as hypertext or an icon. Typical mice have wires that run from a mouse to port on the personal computer, and such mice are generally referred to as tethered input devices.

With the increased market for portable computers, most tethered input devices have been displaced by a joystick built into the keyboard. The joystick can be arranged somewhere upon, for example, a keyboard of the computer, or personal digital assistant (PDA), henceforth generically referred to as portable devices. Such portable devices, however, still require a keyboard and a physical (i.e., wired) connection between the input device and the portable device's input port. An even more portable device absent a keyboard, or the constraints of a mechanically connected joystick, is a tablet portable device.

Tablet devices, or tablet PCs, generally do not use a QWERTY-type keyboard. Instead, a tablet PC utilizes a stylus electronic input device. The stylus communicates with a digitizing surface (i.e., the surface of the tablet electronic display). Since most conventional styluses are shaped like a pen, the typical application is to enter handwritten material into memory of the tablet. For example, an operator will grasp the stylus housing similar to the manner in which a writing instrument is grasped, and the operator will activate a pressure sensitive tip of the stylus by forcing the tip against the digitizer tablet surface. By moving the stylus similar to the way in which a person might sign his or her name on a sheet of paper, the signature would appear on the tablet and be stored in memory.

Although pen-type styluses can be un-tethered, or wireless, most typical styluses require contact with the writing surface. The purpose of contacting the writing surface is two-fold. First, the surface of the tablet might be pressure sensitive such that when the tip contacts the surface, the position of the pen can be ascertained relative to the X and Y coordinates of the tablet. Second, even if the surface is not pressure sensitive, many conventional surfaces utilize radio frequency (RF) waves that are transmitted in close proximity to the tablet upper surface. The surface waves are detected by an antenna or coil placed in the pen. Before the coil is activated to resonate with the imparted RF wave, contact with the tip upon the surface is necessary to detect a pen-down position, in readiness for the handwriting operation. Examples of pen-type styluses used as a writing instrument requiring contact or contact-activation against a tablet surface are described in U.S. Pat. Nos. 6,577,299; 5,565,632; 5,004,871; 4,814,552; and 4,786,765 herein incorporated by reference.

While pen-type styluses represent one type of application for a tablet portable device, another equally viable application is not for the purpose of storing handwritten information but as a pointer. Instead of contacting the surface of a tablet PC to discern the pen position or to activate the pen, it would be desirable to introduce a completely contactless and wireless pointer-type stylus. The desired stylus need not be limited to the entry of handwritten information, but could operate as a remote pointer to select a portion of graphical information displayed on the tablet without physically contacting the tip of the stylus upon the tablet surface. This would allow a user to possibly stand apart and away from the table PC when giving, for example, a demonstration to an audience viewing the screen without blocking or disrupting their angle of sight. Therefore, the desired application is that of a pointer and not necessarily a pen. By implementing improved detection technology, the desired, contactless pointer-type stylus can be operated with other pointers concurrently and, desirably, to implement other contactless technology such as image scanning and so forth.

SUMMARY OF THE INVENTION

The problems outlined above are in large part solved by a pointer-type stylus that can be used with an electronic display absent a QWERTY keyboard. The stylus can communicate with the electronic display and, specifically, with a portable device, such as a tablet PC, over a wireless medium. Moreover, the tip of the stylus need not contact the surface of the electronic display to indicate the position of the stylus tip relative to the display, or to activate the stylus.

According to a preferred embodiment, the stylus includes one or more buttons mounted on the stylus. Each button can be programmed so that the stylus will emit a function recognizable by the portable device whenever the programmed button is actuated. For example, a button can be programmed as a left-click function, a right-click function (e.g., double-click function), a scroll function, or possibly to signify an identification number unique to that particular stylus. One or more buttons can also be programmed to perform a sequence of functions by simply pressing the button once. Often called a "macro" function, by depressing a button a single time, the button performs a sequence of functions such as select function followed by a cut function of the selected text or image. One or more buttons can be programmed to send an optical signal when actuated. The optical signal can impinge upon an image, including but not limited to a barcode, and be read by a reflection from the image so that the pointer-type stylus can also operate as an optical reader of a product assigned to that image, for example.

By programming one or more buttons mounted on the stylus, the stylus can be situated at a distance remote from the electronic display surface. When a button is depressed, the portion of the display commensurate with the detected position of the stylus tip can be selected similar to, for example, a left-click or a right-click actuation function. The stylus need not contact the display in order to determine its position, or to produce a single-click or a double-click function. If the button remains depressed, for example, information upon the display might be scrolled upward or downward until the user releases the button. One or more buttons mounted on the stylus can be programmed either manually by the user selecting such buttons in sequence or by entry from another input device. For example, a window might be displayed upon the electronic display, allowing the wireless and contactless pointer to select one or more properties displayed on the screen via a graphical user interface (GUI).

Once the appropriate property is selected, subsequent actuation of a corresponding button will output the respective logic value sequence corresponding to the programmed function or sequence of programmed functions. The pointer-type stylus can maintain a lookup table within its memory, and a controller is used to program the memory from an external input and to read the memory whenever a button is depressed. By allowing the pointer-type stylus to be remotely configured separate and apart from the display screen, preferably more than several inches and more preferably more than several feet from the display, one or more fields shown on the display can be selected or the display scrolled without use of a keyboard, and without obstructing the view of the display screen. The cursor can therefore appear on the screen by movement of the stylus, or a window or text selected by actuating a button on the stylus, without bringing the stylus to bear against the screen or within the screen viewing angle. The contactless and wireless pointer-type stylus is not necessary for use as a pen-type stylus, but is better utilized as a demonstrative device for use in giving presentations where ease of view by an audience situated at various angles around the display screen is desirable.

According to one embodiment, a stylus input device is provided. The stylus can comprise a transceiver configured near a tip of the stylus to transfer a signal across a wireless medium for determining a position of the stylus absent contact upon the tip. The stylus can also include a button mounted upon the stylus rearward from the tip. The button can be programmably configured to transmit a function or series of functions across the wireless medium upon actuation of the button. The position of the stylus, as well as the selected function can be sent as a digital packet of information from the stylus to the display circuitry. Alternatively, an analog signal can be sent from the stylus to the display circuit. The analog signal comprises carrier signal modulated differently depending on selected function. The modulator might comprise a variable capacitor within a resonant circuit, whose capacitance varies proportional to the function transmitted. A second transceiver can be arranged near the tip to transfer an optical signal upon an image, and receive a second signal corresponding to that image. The signal used for determining a position of the stylus includes any signal that can be sent across a wireless medium, and can include an acoustic signal, an electromagnetic signal, a magnetic signal, and/or an optical signal. Similar to the positioning signal, if a signal is sent to read an image, the image-detecting signal can be sent either digitally as a packet of information, or modulated upon a carrier signal and sent as an analog signal.

According to another embodiment, a wireless input system is provided. The system includes an electronic display and a stylus elevated a spaced distance above the display. An antenna array placed beneath the display screen and configured across the planar screen element is coupled to the display electronics for transferring a signal between the stylus and the antenna array, or grid. Instead of sending, for example, an electromagnetic signal between the stylus and the antenna array, the antenna array can be replaced by only two or more transducers exposed on the surface of the display screen. The transducers are coupled to the display circuitry and transfers acoustic signals sent between the stylus and the transducers. The antenna array sends and receives an electromagnetic signal used to determine a position of the stylus relative to a planar surface of the display, whereas an exposed set of transducers (absent an antenna array) can be used to send and receive an acoustic signal for determining a position of the stylus relative to the planar surface.

The planar surface can be one that has coordinates, such as X and Y, two-dimensional coordinates. At least one button can be arranged on the stylus and programmed by a user. When depressed, the programmed button can send a programmed function to at least one of the transducers to indicate a certain type of input upon the region of the display over which the stylus is positioned. The stylus can include a memory device and a programmable controller. The controller can send logic values to the memory device or fetch logic values from the memory device. The logic values can correspond to values that occur when a user depresses a programmed button. The logic values can be digitally encoded different from the digital signal used to determine the stylus position, both of which can be sent as a packet from the stylus to the antenna grid. Alternatively, if analog domain is used, the logic values can be modulated different from the modulation of the signal used to determine the stylus position. The packetized or modulated logic values will connote a function, and can be differentiated from the position of the stylus.

According to yet another embodiment, a method is provided for entering an input into a computer system. The method includes determining a position of a stylus relative to a two-dimensional plane of an electronic display without contacting the stylus upon the display. The position can then be forwarded across a wireless medium to the computer system. A button mounted on the stylus can be programmed to produce a function or series of functions upon actuation of the button. The function is also forwarded across the wireless medium to the computer system for entering an input into the computer system.

BRIEF DESCRIPTION OF THE DRAWINGS

Further advantages of the present invention may become apparent to those skilled in the art with the benefit of the following detailed description of the preferred embodiments and upon reference to the accompanying drawings in which.

While the invention is susceptible to various modifications and alternative forms, specific embodiments thereof are shown by way of example in the drawings and may herein be described in detail. The drawings may not be to scale. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

As used herein, the term "contactless" generally refers to a stylus having a tip that does not contact the surface of an electronic display. Moreover, the contactless tip is operational outside the surface region of the display, and more than one or two inches from the display surface. The term "pointer-type stylus," hereinafter simply "stylus," is an electronic input device having a mechanism for pointing to a region on the electronic display and selecting that region. The region of the electronic display being pointed to is generally illustrated with a cursor at the pointed-to position. The term "function" refers to the various mechanisms by which the stylus can move, pan, scroll or select an icon, text, or graphic image displayed on a portion of the electronic display. An example of a function used to perform such selection include functions currently available to a mouse, such as a left-click, right-click, programmable click, up scroll and down scroll. Thus, any selection function can be programmed to a particular button or series of buttons to input a command into a computer and/or storage device by virtue of positioning the present stylus over a selectable region, and clicking the programmed button. Each button can also be programmed to perform a macro series of programmed steps, each step can represent an individual function or a portion of an individual function to allow the depression of a single button to perform several functions in sequence.

Figure 1:
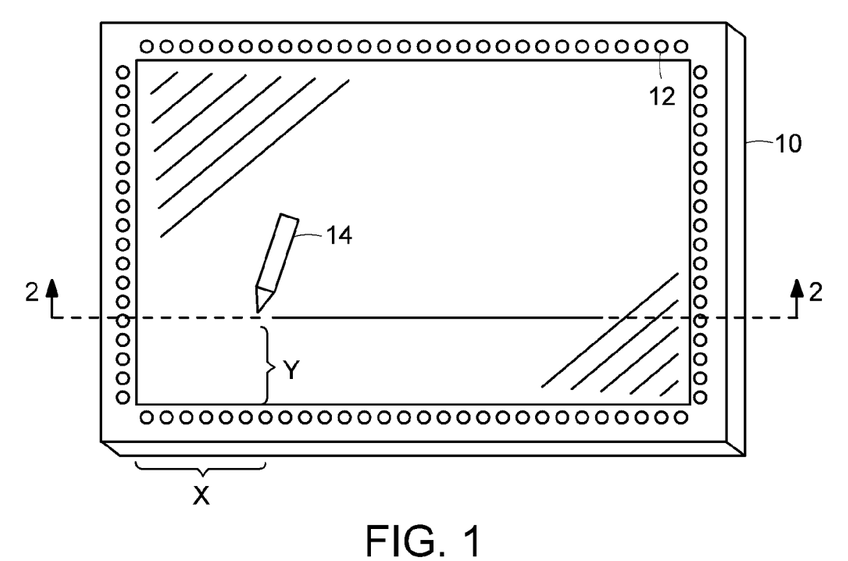
FIG. 1 is a front elevation plan view of an electronic display having an antenna grid of transducers mounted beneath the upper surface of the display or, alternatively, at least two transducers mounted upon the upper surface of the display, and in both instances the transducers and related circuitry are used to triangulate the position of a stylus tip arranged near a particular region of the display.

Turning now to the drawings, FIG. 1 illustrates an electronic display 10. Arranged beneath the upper surface of the display 10 viewing surface is a grid of transducers, generally referred to as an antennae grid. The grid comprises a multiplicity of magnetostrictive transmitting and receiving media disposed parallel with the viewing surface and extending in an X and Y direction. Magnetostrictive vibrations are imparted periodically from one end to the other. When stylus 14 approaches the display surface, the vibrations caused by impingement of acoustic waves sent to stylus 14 from the antennae and thereafter received upon the grid determines the position of stylus 14 relative to the X and Y coordinates of the display. The vibrations are detected by coils or sense amplifiers arranged at or near the terminal ends of each of the X and Y columnar and row antennae grid members. Details of an exemplary magnetostrictive antennae grid structure with receiver and transmitter functionality is set forth in U.S. Pat. No. 4,786,765, herein incorporated by reference.

At the terminal ends of each of the X and Y columnar and row members are receiver/transmitter, or transducers 12. For sake of brevity in the drawing, only a few of possibly hundreds of transducers are shown. It is understood that an increase in the number of transducers 12 in the X and Y direction will increase the stylus positional resolution. As generally known, a transducer is a device that converts one form of energy into another. In the present example, transducers 12 convert a wireless signal, such as an electromagnetic, acoustic, optical, or magnetic signal, into an electrical signal and vice-versa. Thus, transducers 12 can convert sound, light, heat, radio waves, or other forms of energy sent across a wireless medium into alternating or direct electric current. Common examples of transducers include buzzers, speakers, microphones, piezo-electric crystals, light-emitting and infrared-emitting diodes, photo cells, charge-coupled devices, photo detectors, and antennas, etc.

Transducers 12 can be near the outer edges of the grid. Stylus 14 also includes a transducer and a transceiver placed near the tip of stylus 14. The tip is recognized as a region of stylus 14 that converges down to a point, where the point or tip is placed nearest the upper surface of display 10. The transceiver is a combination transmitter and receiver that sends and receives the electrical current generated by or sent to the transducer also within the tip.

When stylus 14 is activated, the tip can send and receive a signal. The signal is transferred between the tip and transducers 12. Regardless of whether the signal is a magnetic, optical, or acoustic signal, a time delay or phase shift occurs between the tip of stylus 14 and each of the transducers 12. The magnitude of that time delay depends on the position of the tip relative to the transducers. Measuring the magnitude of the vibration at each transducer 12 determines the predominant pair of transducers. Armed with the peak amplitude among the transducers arranged in the X and Y directions, the position of the stylus 14 can be determined relative to the display surface. Alternatively, an exposed set of transducers 12 can be arranged on the surface of the display, rather than hidden beneath the display as in the case of an antenna grid. The exposed transducers 12 can be used to send and receive an acoustic wave. The received acoustic wave can be sent to detection circuit coupled to the transducers to discern a time delay between when the transducers received the acoustic wave reflected back from the stylus 14. The time delay is used to triangulate the position of stylus 14 relative to the two-dimensional planar surface of display 10.

Details of acoustic wave triangulation are described in U.S. Pat. No. 4,814,552, herein incorporated by reference. As will be discussed below, in addition to the array of transducers used in a grid arrangement arranged just below the display surface for measuring electromagnetic waves or a set of exposed transducers for measuring acoustic waves near the periphery of the surface, at least one additional transducer is arranged at the surface of the display and exposed to a wireless transmission medium to receive functional information associated with various buttons upon the stylus, receive optically read information as to a scanned image sent from the stylus, and to possibly transmit program information from a graphical user interface (GUI) to the stylus in order to program the stylus buttons.

Figure 2:
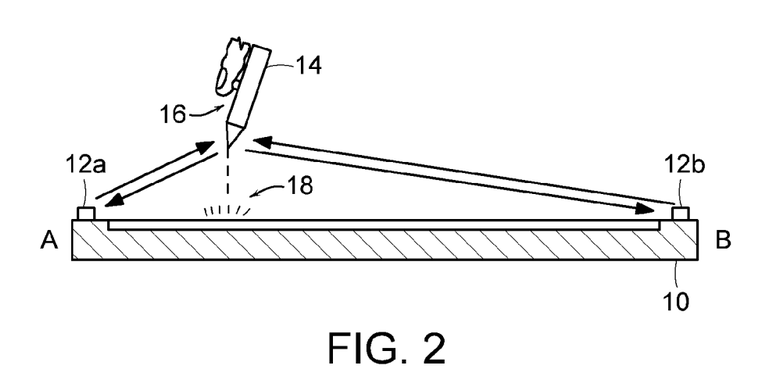
FIG. 2 is a cross-section view along plane 2 of FIG. 1, showing a signal sent between the stylus and the transducer grid.

FIG. 2 illustrates a cross-sectional view along plane 2 of FIG. 1. When the tip of stylus 14 is placed within range of display 10, a signal is sent between stylus 14 and transducers 12a and 12b (as well as other transducers 12 in the X and Y-directions) to calculate a position of stylus 14. Concurrent with that calculation or possibly after or before the position is known, a button 16 can be depressed. As described below, the button can be programmed to perform various functions. For example, the button can be programmed as a left-click similar to a left-click function on a mouse. When depressed, the detected position of stylus 14 over a region 18 of display 10 can be selected, similar to when a user moves a cursor across the displayed window via movement of a mouse and then clicking the left button on that mouse.

Figure 3:
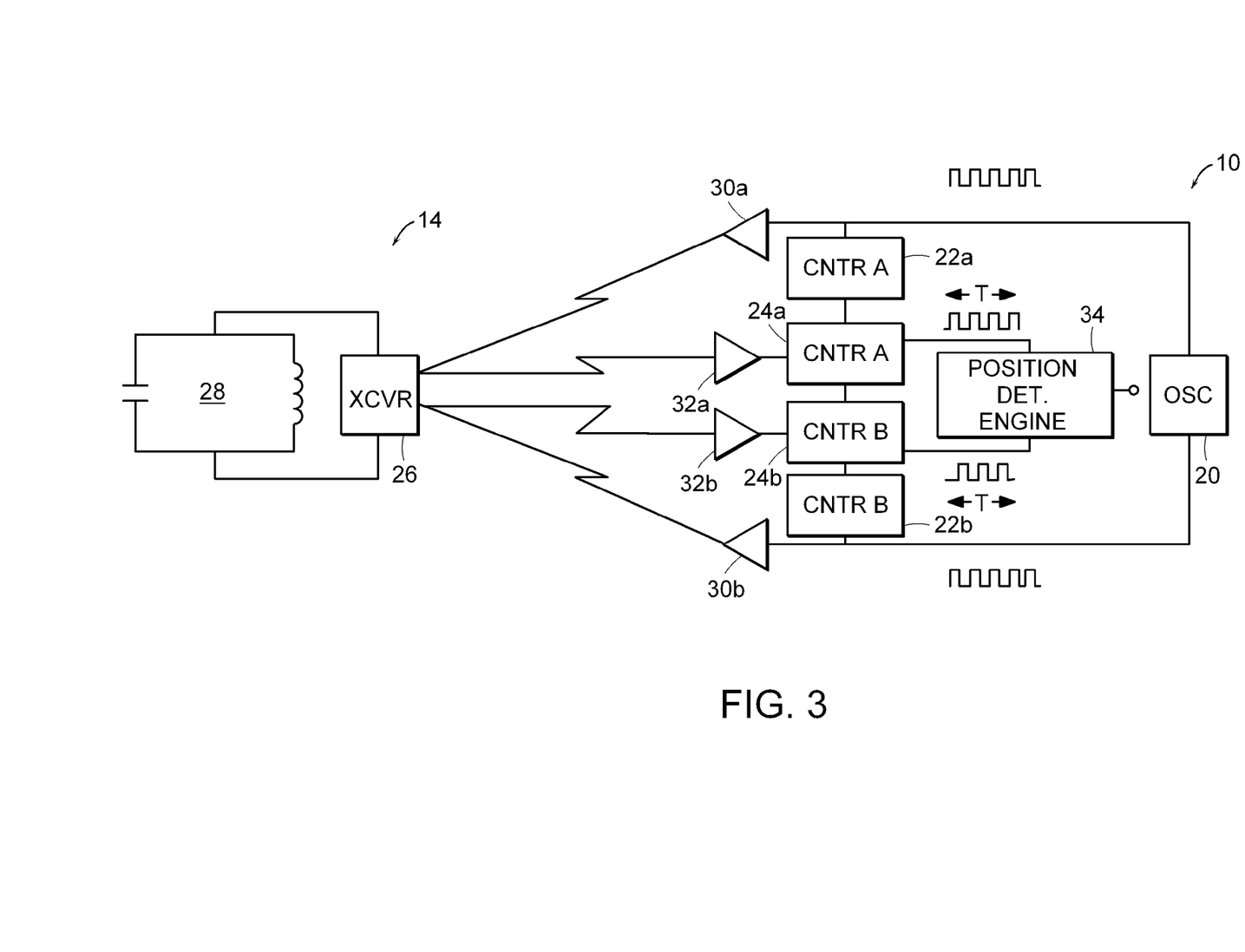
FIG. 3 is a block diagram of one form by which the transferred signal is used to triangulate the position of a stylus tip relative to the XY plane of the display.

There are various mechanisms in which to triangulate a position of a stylus relative to the X and Y coordinates of an electronic display. For example, stylus position can be determined by simply sensing which pair of transducers in the X and Y directions produce the greatest magnetostrictive energy whenever the transducers send an acoustic signal to the stylus that is resonated back to the transducers. The transducers in the X and Y plane nearest the stylus will undergo the greatest sensed energy, thus pinpointing where within the array (or X/Y plane) the tip is nearest. Another example might be through use of a delay reading. The transducer pair that receives the resonated-back signal the soonest might therefore triangulate the position of the stylus tip. A mechanism used to determine the time delay difference might be through use of counters as shown in FIG. 3. Utilizing an oscillator such as a crystal oscillator 20, an oscillating signal can be converted to a squarewave and divided down in frequency via counters 22a and 22b. Counters 22a and 22b can be arranged within display 10 and coupled to transducers 12a and 12b, respectively. The divided-down frequency thereby bears a clock cycle of duration T. Time T can thereafter be used to set and reset counters 24a and 24b.

Within stylus 14 is a transceiver 26 and a resonant circuit 28, according to one example. Transceiver 26 can receive the oscillating squarewave signal from transmitters 30a and 30b associated with transducers 12a and 12b, respectively. Upon receiving the squarewave signals, resonant circuit 28 assumes a resonant frequency that can be varied by virtue of possible changes to the capacitor and inductor values, as will be described below. Thus, the received signal can be modulated if necessary to setup a particular function. In the example shown, the capacitor within resonant circuit 28 as well as the inductor can be set so that the received signal is modulated and sent back via transceiver 26 to receiver circuits 32a and 32b. Receiver circuits 32a and 32b are placed near transducers 12a and 12b, respectively. Accordingly, depending on the distance between stylus 14 and transducers 12a and 12b, the number of pulses counted by counters 24a and 24b will vary. In the example shown, if the distance between stylus 14 and transducer 12b is longer than the distance between stylus 14 and transducer 12a, there will be fewer pulses counted by counter 24b than counter 24a within time T. A position detection engine 34 will count the pulse number difference and, based on that difference, will quantify the position of stylus 14 relative to transducers 12a and 12b.

An altogether different mechanism might be to use the stylus 14 as a signal generator rather than simply as a transceiving resonator. The stylus can include an energy source, such as a battery or rechargeable capacitor that is used to maintain power to a memory device. Upon receiving a start signal, the stylus 14 initiates a fetch procedure whereby a set of digital pulses are fetched from the memory device. The digital pulses are sent as a packet of digital 1s and 0s from stylus 14 and received upon the sense amplifiers of transducers 12a and 12b. Thus, instead of an analog resonator circuit 28, a digital pulse generator can be used. The digital pulses, however, similar to the analog counterpart, can be counted to determine which pair of transducers receives the packet of information the soonest. Once the first-receiving pair of transducers is determined in the X and Y arrangement, the stylus position is determined relative to the display surface.

While FIG. 3 illustrates two sets of counters relative to a one-dimensional triangulation, position detection engine 34 can easily accommodate three sets of counters, or more, to triangulate a two- or possibly three-dimensional position. For sake of brevity and clarity in the drawing, however, only two sets are shown; however, it is readily apparent to the skilled artisan that two- and possible three-dimensional triangulation can occur depending on the number of counters and transducers used. It is also apparent that the signal sent between the transducers and the stylus can be modulated and thereafter demodulated unique to representing a position of the stylus, different from another signal that can be sent between the stylus and the transducers that is modulated different from the positional signal. In this fashion, the same wireless medium can be used to send not only positional signals, but also functional signals representative of a button function or a pointer identification number of one or more styluses concurrently communicating with the electronic display 10.

Figure 4:
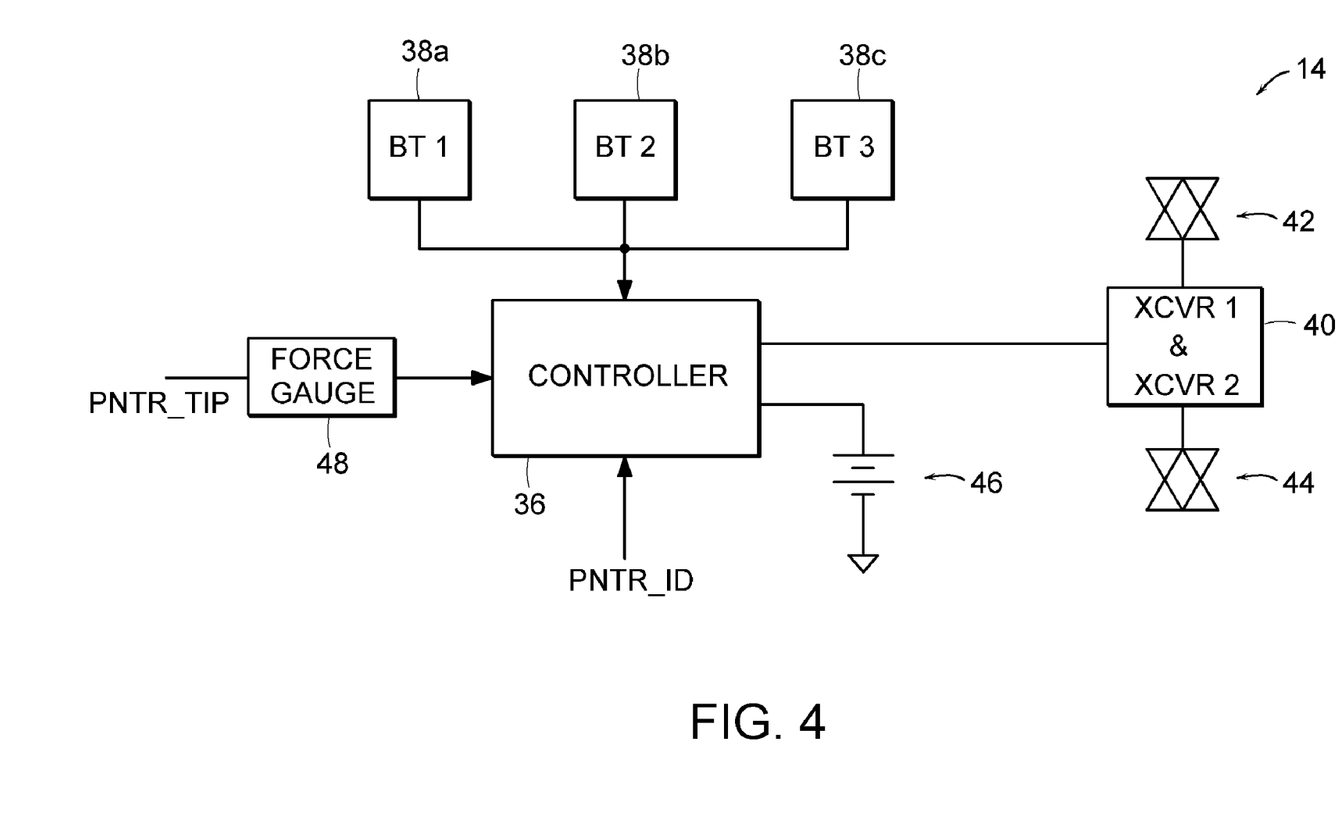
FIG. 4 is a block diagram of the stylus.

FIG. 4 illustrates in block diagram several components of stylus 14. A controller 36 can be used to receive programmable input. The input constitutes instructions used for assigning a set of logic values to each of one or more buttons 38a, 38b, and 38c arranged upon stylus 14. Once programmed, the buttons can be user-actuated and a corresponding set of logic values sent to controller 36 via, for example, a lookup operation. The fetched logic values can then be sent as a set of digital logic values within a packet of information to transceiver 40 and then outward to the electronic display via antenna 42. Alternatively, if backward compatibility to analog transmission systems are needed, the fetched logic values can be used to modulate a carrier signal, wherein the modulated signal is sent to a transceiver 40 and then outward to the electronic display via antenna 42. One or more buttons can also be programmed to initiate an optical signal so that possibly another transceiver, if the first transceiver sends an acoustic or magnetic signal, can send an optical signal via a light-emitting diode 44 to an image having optically contrasting printed information, such as darkened lines spaced from each other similar to a barcode.

An energy source 46 can be used to power the circuitry of stylus 14, including maintaining power to volatile memory which contains the programmed logic values corresponding to various buttons. Energy source 46 can be either a battery or a rechargeable voltage storage device, or capacitor. When placed into a docking system, stylus a capacitor can be recharged relatively easy, and quickly, as compared to a rechargeable battery, for example. If, for example, the stylus is chosen to operate in dual mode allowing a pen-type operation as well as a pointer-type operation, a force gauge 48 can be provided. Force gauge 48 can mechanically collapse onto possibly a switch to know when the tip comes in contact with the display surface. Although the stylus is designed to be capable primarily of contactless operation, an option may exist whereby it can operate both in contactless and contact operation.

Figure 5:
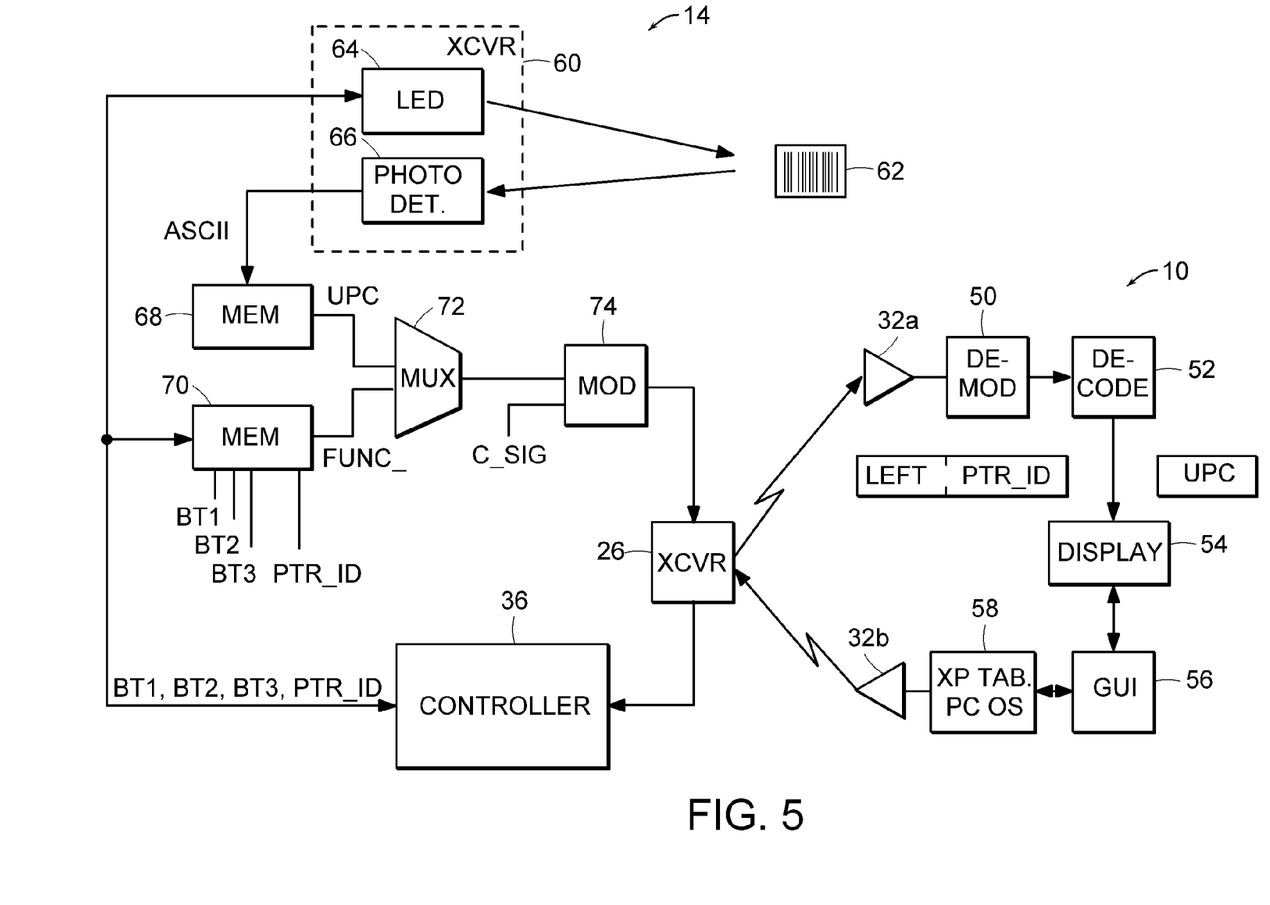
FIG. 5 is a block diagram of the dual-mode barcode scan and pointer functionality of the stylus in communication with the display for programming the button functions either manually or through the graphic user interface of the display driver circuitry.

Referring to FIG. 5, stylus 14 is shown having two modes of operation. In one mode, stylus 14 includes a transceiver 26 that transfers a first signal to and from display 10. Display 10 is shown having a receiver and transmitter 32a and 32b.

Receiver 32a can demodulate 50 the incoming signal to differentiate that signal as possibly a transmitted function or possibly a positional signal in which triangulation is performed. For sake of brevity, only one transducer is illustrated; however, it is understood that two or more transducers are typically used to fix a position relative to display 10. Once demodulated, the encoded signal can be decoded 52. For example, the encoded signal might represent a particular function that is encoded different from another function, or possibly encoded different from a positional signal. If so, the decoder 52 determines what type of function or possibly the particular stylus that is sending the signal from other functions or positional signals. For example, a left-click function might have bit sequence 1100 as opposed to a right-click function of 1010.

As shown, the exemplary left-click function can be sent as a field of bits within a packet, along with the sequence of bits that uniquely represent that stylus (i.e., the PTR_ID). That information can be sent to the display driver 54 to allow the function to select the region over which the stylus is positioned. That information then gets fetched from the corresponding memory of the display microcontroller, where it is then decoded by an execution engine and the corresponding operation occurs. If, for example, the stylus 14 operates digitally instead of in an analog mode, the information from memory 68 and 70 (depending on the mode of operation) can be sent directly to transceiver 26, absent any need for modulation. The optical image or the function (or macros of functions) can be represented as a series of binary 1s and 0s that gets sent within a packet to the display 10 via transceiver 26—with no need to modulate at the transmit side or demodulate at the receive side.

Display driver 54 can also produce the appropriate graphical user interface 56 to open, for example, various properties that can be selected by the user cursor. Preferably, the operating system can be obtained from Microsoft Corporation as Microsoft Windows XP Tablet PC Edition®. The operating system 58 thereby implements the appropriate graphical user interface that can be selected by a user and output onto the display drivers 54 or possibly onto the transmitter 32b if the GUI to program various button functions, as will be described below.

Stylus 14 implements transceiver 26 to fix the positional orientation of the stylus tip as well as to send encoded logic values representative of programmed button functions. According to another mode of operation, another transceiver 60 can be used to send and receive optical signals onto a graphical image, possibly a barcode of alternating thick and thin stripes with different spacings on a white background. The graphical image 62 receives an optical signal from light-emitting diode 64, and emits an optical reflected signal onto photo detector 66. Photo detector 66 can include an array of photodetectors with a charge-coupled device (CCD). After an appropriate exposure time, the charge packets in each photo-detector of the array can be simultaneously transferred by charge coupling to a parallel CCD shift register to determine the light and dark outlines of the optically contrasting two-dimension (or one-dimensional) image 62. If image 62 is a barcode indicia, indicia preferably includes encoded universal product code (UPC) information pertinent to the product to which the barcode label is affixed. Photo detector 66 receives a signal of logic 1 and logic 0 voltage values corresponding to ASCII code sent to, for example, a memory device 68. Memory device 68 can thereby perform direct memory access (DMA) in a lookup environment to convert the ASCII code to, for example, a code recognizable as UPC values.

Along with the UPC values, button functionality is maintained at the input of a multiplexer, for example. Controller 36 can receive GUI input to program certain button functions selected via GUI 56 and received by transceiver 26 onto controller 36. Controller 36 thereafter encodes those functions into the appropriate word lines of memory 70. Alternatively, drivers can be connected to each of the corresponding buttons and an encoding device can be placed at the interim between those drivers and memory 70 to input the programmed values by depressing a sequence of buttons or a dedicated program button with selectable scroll options using, for example, non-volatile memory or ROM. The non-volatile memory or ROM output can then be forwarded directly to the drivers and into memory 70. Thereafter, if one or more of the buttons are depressed, the stored logic values within memory 70 are read from memory 70 and placed upon multiplexer 72.

Depending on whether the first mode or the second mode is chosen, multiplexer 72 will either forward the image 62 code or the function code of logic 1 and logic 0 voltage values onto a carrier signal. The function-encoded or image-encoded signal is selectively multiplexed and sent directly as part of a digital packet, or is selectively multiplexed and modulated onto a carrier signal using various well-known modulation techniques. For example, if analog transmission is desired, the encoded signal can amplitude modulate, frequency modulate, or phase modulate the carrier signal via modulator 74 to transmit a signal across the wireless medium to receiver 32 depending on whether the input is a function (from among numerous programmable functions) or a UPC value. Demodulator 50 can then discern what type of function or image value was sent.

Figure 6:
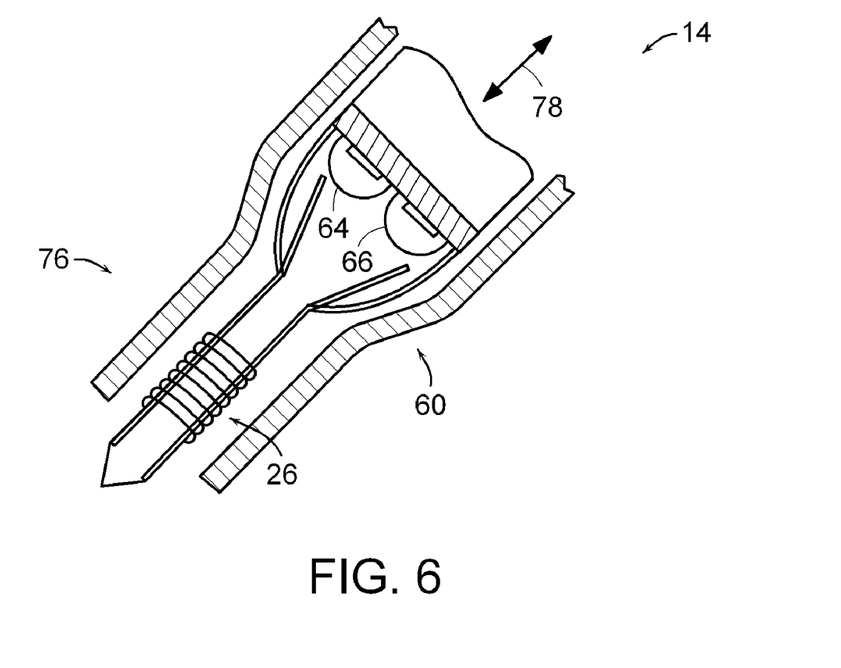
FIG. 6 is a partial cross-sectional view of the stylus tip.

FIG. 6 illustrates a portion of stylus 14 having a first transceiver/transducer 26 and a second transceiver/transducer 60. The first transceiver is used to send and receive a signal across a wireless medium to denote an image, function, or positional value. The image and functional values are those stored in memory and output upon the wireless medium depending on which button is depressed to actuate the function or the photo detector output. Transceiver 26 can be implemented as a coil antenna to receive, for example, acoustic signals sent from transducers 12 (FIG. 1) and to send resonating acoustic signals back to the transducers for determining the X and Y coordinates, as well as sending functional or image values.

As shown, integrated within the tip 76 of stylus 14 is an LED 64 and one or more photodetectors 66 of transceiver 60. The distal end of tip 76 should be optically translucent to allow the sending and receiving of optical signals. The received signals can then be forwarded to memory lookup and output as an encoded signal from the transmitter of transceiver 26. If tip 76 is designed to also contact the display surface (if desired), tip 76 can reciprocate along axis 78 to activate a switch indicating contact has been made. Although stylus 14 is designed to operate in a contactless application, it is envisioned that a dual contact and contactless functionality is possible.

Figure 7:
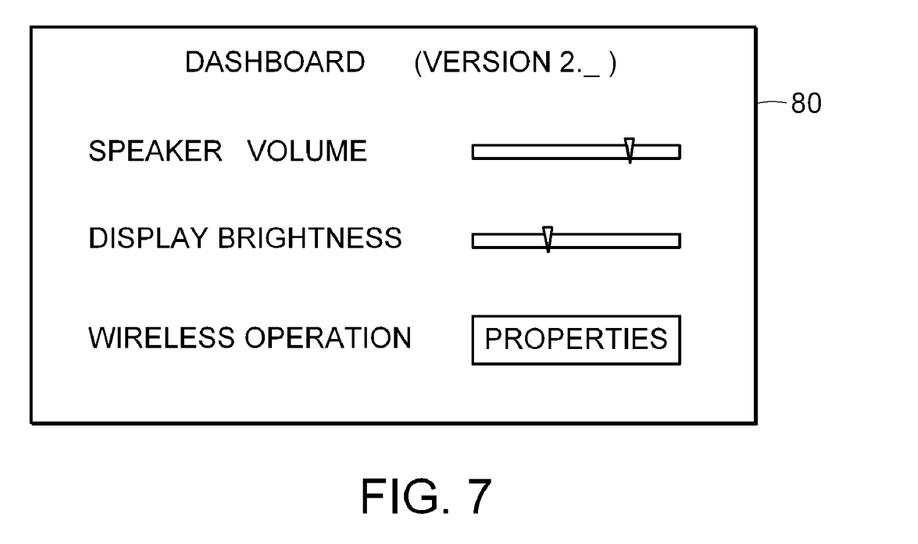
FIG. 7 is a screen shot of a window displayed on the electronic display having a GUI for setting properties of the stylus.

As indicated in FIG. 5, controller 36 can receive instructions via a GUI 56 to program memory 70. The GUI functionality occurs in conjunction with the display driver 54 to produce possibly a user-selected set of properties shown in FIG. 7. As illustrated in FIG. 7, a window popup 80 can occur by the user moving the stylus tip and presenting a curser at a particular location upon the display, and then actuating a button to select that window.

Figure 8:
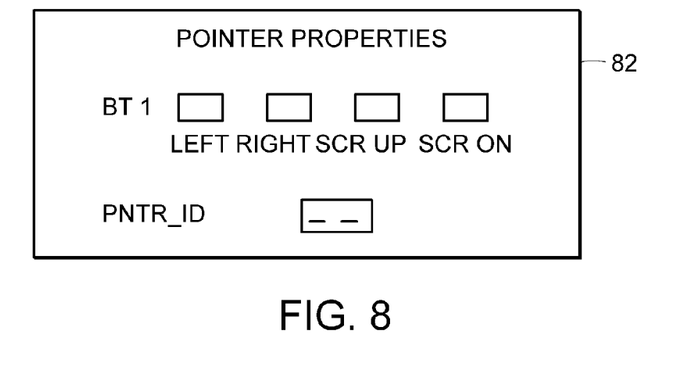
FIG. 8 is a screen shot of a window display upon activating the wireless operation properties button of FIG. 7 for setting the functionality of one or more buttons upon a stylus, and for assigning a pointer identification number to that stylus.

Window 80 might have certain GUI properties, one of which is the wireless operation of the stylus. By drawing the stylus tip a spaced distance over the box marked "properties"

and then actuating a particular button, another window might be brought forward on the display, such as window 82 in FIG. 8. Window 82 allows the user to place the cursor in any one of the boxes to the right of button 1 (BT 1). Once the cursor is placed into the appropriate box, the user can actuate a button to reconfigure the first button, among a plurality of buttons on the stylus, to the functionality selected. In addition, the user can also place the cursor into the pointer identification box, and scroll up and down to change the numbers within that box by, for example, continuously depressing another button on the stylus. This will change the pointer identification number assigned to that stylus depending on the length of time (and corresponding number) at which the button is depressed and the number displayed.

Figure 9:
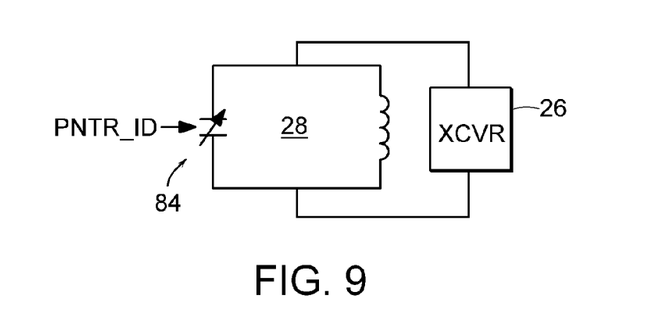
FIG. 9 is one example by which the assigned pointer identification number can be sent along with a packet of digital information representing the button function, or used to modulate the resonate frequency of an acoustic signal sent from the stylus to differentiate possibly multiple styluses from each other, each of which can be concurrently used as pointers upon a single display.

Assigning a unique pointer identification number to a stylus allows possibly more than two styluses to be operated concurrent with one another. The unique pointer identification number corresponds to a unique set of logic values stored within memory of the stylus. Those logic values can then be fetched from the memory and input into a capacitor array to form a variable capacitance value of the variable capacitor within the resonant circuit 28 shown in FIG. 9. By modifying the capacitance value within the variable capacitor 84, the signal sent to and from transceiver 26 can be modified in frequency. The modified frequency signal can be discerned from other signals that are modified to a different frequency based on their pointer identification values. This allows the PC position detection engine 34 (FIG. 3) to detect a unique position for each stylus since each stylus now changes the resonant frequency by a unique pointer identification value amount.

Figure 10:
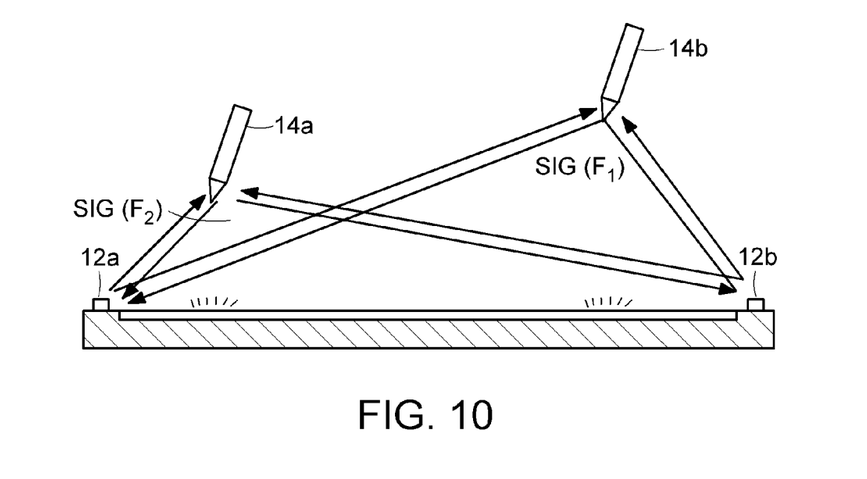
FIG. 10 is a side elevation view of multiple styluses that can be used concurrently upon a single display.

FIG. 10 illustrates possibly one way in which the resonant circuit modifies the resonant frequency so that even though the transducers 12*a* and 12*b* emit the same frequency to two or more styluses 14*a* and 14*b*, the return signal from stylus 14*a* resonates at a different frequency than that from stylus 14*b*, as detected by transducers 12*a* and 12*b*. The return signal can be time division multiplexed and counters assigned to fix the positional value of each of possibly a plurality of styluses to allow multiple pointer-type styluses to be operating concurrent with one another.

Instead of modifying the resonant frequency to discern pointers from each other, and thus instead of operating in an analog domain indigenous to many legacy devices, a digital identification system can be employed. Each stylus can have its own unique pointer identification value, and that value can be stored for example in non-volatile memory of the stylus. The pointer identification value can be fetched on a configuration or start up routine, and loaded into memory 70 (FIG. 5). Thereafter, whenever a packet of function and/or image information is sent from a stylus 14 to display 10, the packet can also contain the pointer identification value unique to that stylus.

It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A method for entering an input into a computer system, comprising:

determining a position of a stylus relative to a two dimensional plane of an electronic display without contacting the stylus upon the display;

forwarding the position across a wireless medium to the computer system for displaying the position upon the display;

programming a button mounted upon the stylus to produce a function upon actuation of the button, wherein said programming comprises:

positioning the stylus so that it points to one of a plurality of functions displayed in a graphical user interface (GUI) window;

actuating the button to select the function pointed to by the stylus; and storing a series of logic values corresponding to the selected function within the stylus, so that the button performs the selected function upon subsequent actuation of the button; and forwarding the function across the wireless medium to the computer system for entering an input into the computer system.

2. The method as recited in claim 1, wherein said forwarding the position and said forwarding the function occur at substantially the same time.

3. The method as recited in claim 1, wherein said forwarding the function occurs without contacting the stylus upon the display.

4. The method as recited in claim 1, further comprising using the stylus to scan an image, forwarding coded information representing the image to the computer system and displaying particulars of a product corresponding to the image upon the display.

5. The method as recited in claim 1, wherein said programming occurs without contacting the stylus upon the display.

6. The method as recited in claim 1, wherein the selected function is selected from a group comprising a left-click function, a right-click function, a programmable-click function, and a scroll-function.

7. The method as recited in claim 1, wherein the selected function comprises a macro series of programmed steps, which are performed in sequence upon the subsequent actuation of the button.

8. The method as recited in claim 1, further comprising reprogramming the button mounted upon the stylus to produce a different function upon actuation of the button, wherein said programming comprises:

positioning the stylus so that it points to another one of the plurality of functions displayed in the GUI window;

actuating the button to select the function pointed to by the stylus; and storing a different series of logic values corresponding to the newly selected function within the stylus, so that the button performs the newly selected function upon subsequent actuation of the button.

9. The method as recited in claim 1, further comprising assigning a pointer identification number to the stylus, wherein said assigning comprises:

positioning the stylus so that it points to a pointer identification box displayed in the GUI window;

actuating another button mounted upon the stylus to change a pointer identification number displayed in the pointer identification box; and storing a series of logic values corresponding to the pointer identification number within the stylus.

10. The method as recited in claim 9, wherein said forwarding a function comprises forwarding a packet across the wireless medium, wherein the packet comprises the series of logic values corresponding to the selected function and the series of logic values corresponding to the pointer identification number.

11. The method as recited in claim 9, wherein said forwarding the position and said forwarding the function comprise modulating a carrier frequency used to perform said forwarding steps by an amount corresponding to the pointer identification number.

* * * * *